US012166945B1

(12) United States Patent
Morovic et al.

(10) Patent No.: US 12,166,945 B1
(45) Date of Patent: Dec. 10, 2024

(54) CUSTOM HALFTONE FOR LIMITED EDITION PRINTS

(71) Applicant: Hewlett-Packard Development Company, L.P., Spring, TX (US)

(72) Inventors: Peter Morovic, Sant Cugat del Valles (ES); Jan Morovic, London (GB); Hector Gomez Minano, Sant Cugat del Valles (ES); Sergio Etchebehere Juan, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/473,497

(22) Filed: Sep. 25, 2023

(51) Int. Cl.
| | |
|---|---|
| *H04N 1/40* | (2006.01) |
| *G06K 15/02* | (2006.01) |
| *H04N 1/00* | (2006.01) |
| *H04N 1/23* | (2006.01) |
| *H04N 1/405* | (2006.01) |
| *H04N 1/52* | (2006.01) |

(52) U.S. Cl.
CPC ....... *H04N 1/4052* (2013.01); *G06K 15/1881* (2013.01); *G06K 15/1884* (2013.01); *H04N 1/00143* (2013.01); *H04N 1/233* (2013.01); *H04N 1/2338* (2013.01); *H04N 1/2369* (2013.01); *H04N 1/52* (2013.01)

(58) Field of Classification Search
CPC ................. H04N 1/233–2369; G06K 15/1884
See application file for complete search history.

(56) References Cited

U.S. PATENT DOCUMENTS

| | | | |
|---|---|---|---|
| 9,681,020 B2* | 6/2017 | Göktekin | ........... H04N 1/32309 |
| 10,628,647 B1 | 4/2020 | Rossier et al. | |
| 11,049,350 B2 | 6/2021 | Boutant et al. | |
| 2005/0166052 A1 | 7/2005 | Khormaei et al. | |
| 2018/0084151 A1* | 3/2018 | Lockwood | ......... H04N 1/00413 |
| 2023/0044174 A1 | 2/2023 | Amir et al. | |
| 2023/0044309 A1* | 2/2023 | Dodov | ....................... G06F 3/03 |

* cited by examiner

*Primary Examiner* — Barbara D Reinier
(74) *Attorney, Agent, or Firm* — Jordan IP Law, LLC (57) ABSTRACT

Systems, apparatuses, and methods may provide for technology to control the printing of halftoning screen signatures for various levels of prints. For example, such prints may include regular edition prints or limited edition prints. During printing, a first halftoning screen is associated with one or more of the regular edition prints and a second halftoning screen is associated with the limited edition print, in some implementations. The second halftoning screen has a spatial frequency that is substantially the same as the first halftoning screen while having a spatial signature different from the first halftoning screen. Additionally, the second halftoning screen further may have spectral properties that are substantially the same as the first halftoning screen. During printing, two different printed copies of an image are formed using the first halftoning screen and the second halftoning screen.

15 Claims, 10 Drawing Sheets

CUSTOM HALFTONE FOR LIMITED EDITION PRINTS

BACKGROUND

In printing, halftoning is a process in which a discrete number of printing materials are distributed spatially to generate a continuous-tone image. For example, drops of one or more different colored inks may be allocated to halftone pixels within a halftone according to a pattern which may be aimed at improving image quality.

BRIEF DESCRIPTION OF THE DRAWINGS

Various examples will be described below by referencing the following drawings, in which.

DETAILED DESCRIPTION

In high-end fine art printing, image quality is critical to customers who buy such editions. Often artists also wish to limit the number of copies a given image can be reproduced, sell limited edition prints, and desire a way to be able to authenticate whether a copy is legitimate or not. The challenge addressed herein is how to maintain the high image quality of a printed image while also having a way to distinguish it from a regular print.

Some existing solutions include overt elements in the print. Such over elements may include security content (e.g., a barcode, a quick-response code (QR) code, etc.). Alternatively, the image may be altered in an obtrusive manner (e.g., such as introducing visible yellow dots). Another alternative may rely on high precision imaging (e.g., microscopic imaging for to identifying a specific print sample based on its specific signature). Alternatively, the addition to electronic tags (e.g., Radio Frequency Identification (RFID)) can also be used.

As will be discussed in greater detail below, some implementations herein provide for technology to introduce a detectable difference between two prints, without affecting image quality or color consistency. It will be appreciated that these two features of introducing a detectable difference between two prints without affecting image quality or color consistency typically are in conflict against each other. For example, detectable differences between two prints typically result in changes in image quality from print to print, which are typically undesirable.

Systems, apparatuses, and methods described in some implementations herein provide for technology to control the printing of halftoning screen signatures for various levels of prints. For example, such prints may include regular edition prints, limited edition prints, and/or unique edition prints. As used herein the term "regular edition prints" refers to a print having no preset limited number of a plurality of prints. As used herein the term "limited edition prints" refers to a print having a preset limited number of one or more prints. As used herein the term "unique edition prints" refers to a limited edition print that is limited only to a single print.

In some implementations, a print service provider receives a registration request to print a regular edition print, a limited edition print, or a unique edition print from a printer customer. In response, the print service provider sends registration permission to the print customer. During printing by the printer customer, a first halftoning screen is associated with one or more of the regular edition prints and a second halftoning screen is associated with the limited edition print or the unique edition print, in some implementations. The second halftoning screen has a spatial frequency that is substantially the same as the first halftoning screen while having a spatial signature different from the first halftoning screen. Additionally, the second halftoning screen further may have spectral properties that are substantially the same as the first halftoning screen. During printing, two different printed copies of an image are formed using the first halftoning screen and the second halftoning screen. In some examples, such halftoning screens may be stored with the print service provider for authentication purposes.

Some color spaces include area coverage spaces, such as the Neugebauer Primary area coverage (NPac) color space. An NPac vector in the NPac color space represents a statistical distribution of Neugebauer Primaries (NPs) over an area of a halftone. In a simple binary (bi-level, i.e., two drop states: "drop" or "no drop") printer, an NP may be one of $2^k-1$ combinations of k printing fluids within the printing system, or an absence of printing fluid (resulting in $2^k$ NPs in total). An NP may thus be seen as a possible output state for a print-resolution area. The set of NPs may depend on an operating configuration of a device, such as a set of available colorants. A colorant or printing fluid combination as described herein may be formed of one or multiple colorants or printing fluids. For example, if a bi-level printing device uses CMY printing fluids there can be eight NPs or output states. These NPs relate to the following: C, M, Y, CM, CY, MY, CMY, and W (white or blank indicating an absence of printing fluid). An NP may comprise an overprint of a plurality of available printing fluids, such as a drop of magenta on a drop of cyan (for a bi-level printer) in a common addressable print area (e.g., a printable "pixel"). An NP may be referred to as a "pixel state".

Each NPac vector may therefore define a probability distribution for colorant or printing fluid combinations for each halftone pixel in the halftone (e.g., a likelihood that a particular colorant or printing fluid combination or available output state is to be placed or defined at each pixel location in the halftone). In this manner, a given NPac vector defines a set of halftone parameters that can be used in the halftoning process to map a color to NPs to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. An example of a printing pipeline that uses area coverage representations for halftone generation is a Halftone Area Neugebauer Separation (HANS) pipeline.

Each pixel of an image is associated with a color value or tone, for example 0-256 for each color of an 8-bit color space. A halftone pattern comprises a plurality of halftone pixels having pixel values depending on the tone, also referred to herein as the halftone value. The halftone pattern may be represented by 1's and 0's in a matrix or array and which indicate dots or no dots in the halftone pattern. For example, a dark image pixel may have a tone or halftone value of 220 and may be rendered using a halftone pattern with a dense distribution of "dots" or colorant drops which may be represented as many pixel values of "1" in the halftone matrix. A light image pixel may have a sparse distribution of dots represented a halftone matrix with few pixel values of "1" but many pixels values of "0" or "no dot". Different halftone patterns may be used depending on many factors such as the printing application, the substrates, colorants and printing equipment used, and how the printed image may be viewed.

A halftone matrix may be defined having element values which correspond to dots in a halftone pattern at different tones. For example, a halftone matrix may have an element value 1 corresponding to tone=1 and which represents the location of a dot in the halftone pattern for tone=1. For tone=2, the halftone matrix may have an element value 2, which together with the element value 1, represent the locations of two dots in the halftone pattern for tone=2. This assignment of tone element values in the halftone matrix may continue until a maximum tone value having all dots in the halftone pattern. A halftone pattern for a given tone may then be determined from the halftone matrix by finding all element values equal to or less than the tone. In other examples, different numbers of element values or dots may be assigned for each tone.

When using NPac, the NP associated with the NPac vector are distributed across the halftone pixels according to some pattern to provide the relative area coverage of NP defined by the NPac vector. In order to avoid visual artifacts such as Moire, the distribution of NP across the pixels of one halftone pattern are changed compared with the distribution of NP across the pixels of adjacent halftone patterns. For example, this is achieved by randomizing the distribution of NP across each halftone pattern. This may be achieved by applying Blue or Green noise to the distribution.

Figure 1:
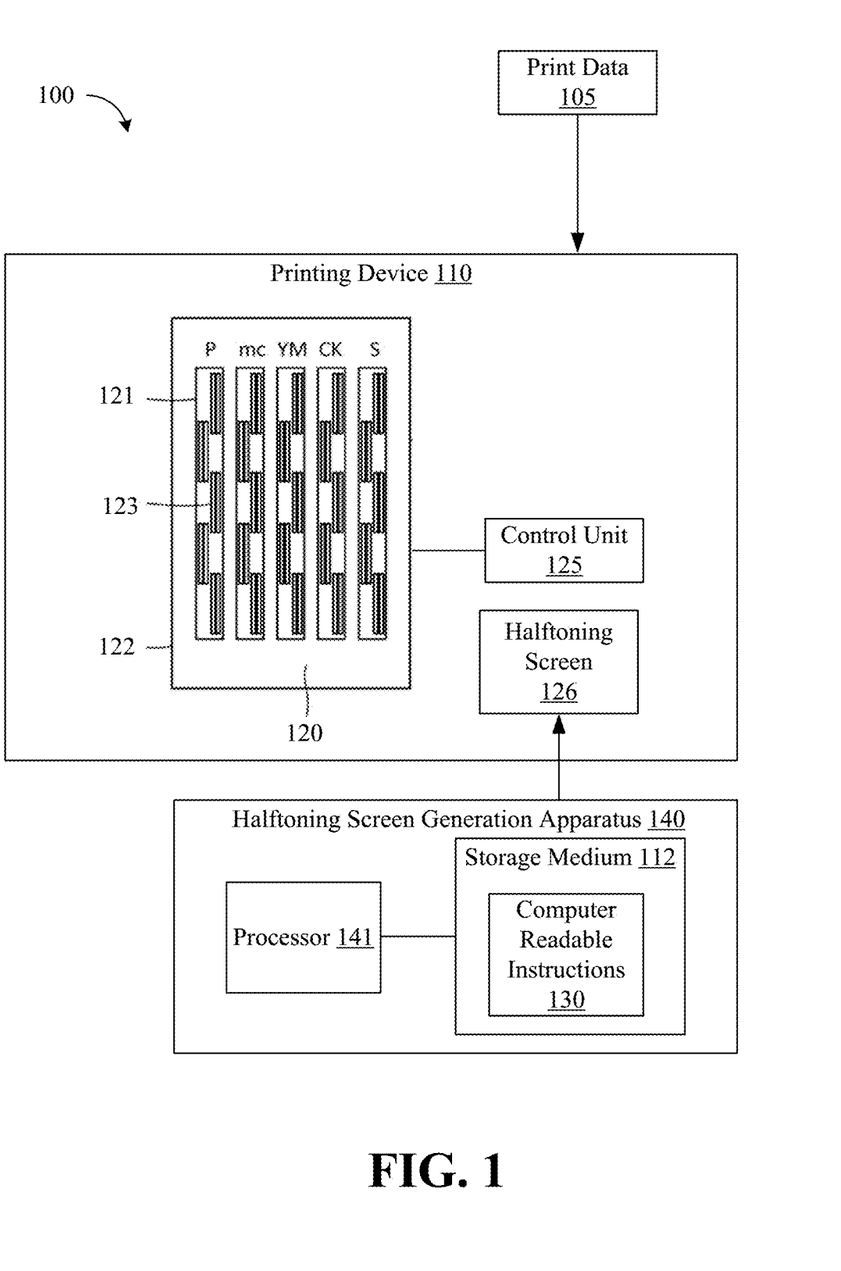
FIG. 1 is a schematic view illustrating a printer system for custom halftone usage in limited edition prints according to an example.

FIG. 1 shows an example of a printing system 100 including a printing device 110 and a halftoning screen generation apparatus 140.

The printing device 110 comprises a carriage assembly 120 and a control unit 125. The carriage assembly 120 comprises a set of printheads 121 carried by a carriage 122. A drive assembly (not shown) moves the carriage assembly 120 along a scan axis in response to drive signals from the control unit 125. Alternatively, printing device 110 is a laser printer in some implementations, which will have a system structure that differs from the inkjet printer illustrated in FIG. 1.

Each of the printheads 121 comprises a plurality of dies 123, with each die comprising a plurality of nozzles through which drops of printing fluid are dispensed. The printheads are fluidly coupled to fluid reservoirs (not shown), which supply printing fluids to the printheads. Each printing fluid may be a colorant or a non-colorant, such as a pre-treatment (e.g., fixer/optimizer) or post-treatment (e.g., overcoat) fluid. In the illustrated example, the printing device comprises five printheads that are supplied with eight different printing fluids: cyan (C), magenta (M), yellow (Y), black (K), light cyan (c), light magenta (m), optimizer (P) and overcoat(S).

The control unit 125 may comprise a processor, a storage medium, and an input/output interface (not shown). The printing device 110 also comprises a halftone matrix 126 which may be used by the control unit in a halftoning process for rendering an image initially received as print data 105. The halftone matrix 126 may be used to generate halftone patterns for different tones or halftone values in image pixels of different color values. The halftone matrix may be received from the halftoning screen generation apparatus 140.

The halftoning screen generation apparatus 140 comprises a processor 141 and a storage medium 112. The processor 141 is responsible for controlling the operation of the halftoning screen generation apparatus 140 and executes computer readable instructions 130 stored in the storage medium 112. The computer readable instructions 130 comprises instructions, which when executed by the processor 141, implement a halftoning screen generation method. In some implementations, halftoning screen generation apparatus 140 is implemented as part of the printing device 110 to locally generate halftoning screens. Additionally, or alternatively, halftoning screen generation apparatus 140 is located remotely (e.g., at a server) to generate halftoning screens and supply them to the printing device 110.

During use, the printing device 110 receives print data 105. In one example, the print data 105 may be a raster image generated by a raster image processor. A color mapping module or process (not shown) maps the colors of the print data 105 (e.g., RGB or CMYK) to the colors of the printing device 110, for example CMYKcmPS.

The color mapping module may map the colors to an area coverage color space, such as the Neugebauer Primary area coverage (NPac) color space. In NPac color space, each pixel of an image is represented by an NPac vector. A Neugebauer Primary (NP) corresponds to one of the possible combinations of printing fluids at each image pixel, including the absence of any printing fluids. The total number of NPs depends on the number of printing fluids, k, and the number of drop states, D, for each printing fluid, and may be defined as Dk. So, for a printing device having three printing fluids (e.g., cyan, magenta and yellow) and two drop states (zero drops and one drop), the NPs are: blank, C, M, Y, CM, CY, MY and CMY. An NPac vector defines the relative area covered by each of the NPs. So, for example, an NPac vector of [magenta: 0.3; cyan: 0.2; blank: 0.5] implies that 30% of the area is magenta, 20% is cyan, and 50% is blank.

A halftoning process using the halftone matrix 126 converts image data output by the color mapping module into a plurality of halftone patterns, each corresponding to an image pixel. The carriage assembly 120 is controlled by the controller 125 to print the halftone patterns onto a print medium by controlling the travel of the carriage 120 and the firing of the nozzles of the printheads 121 according to the halftone patterns.

The computer readable instructions 130, when implemented by the processor 141, cause a number of actions. As will be described in greater detail below, computer readable instructions 130 are to control the printing of halftoning screen signatures for various levels of prints. For example, such prints may include regular edition prints, limited edition prints, and/or unique edition prints. During printing, a first halftoning screen is associated with one or more of the regular edition prints and a second halftoning screen is associated with the limited edition print or the unique edition print, in some implementations. The second halftoning screen has a spatial frequency that is substantially the same as the first halftoning screen while having a spatial signature different from the first halftoning screen. Additionally, the second halftoning screen further may have spectral properties that are substantially the same as the first halftoning screen. During printing, two different printed copies of an image are formed using the first halftoning screen and the second halftoning screen.

In operation, an image former (e.g., printing device 110) is to form a copy of an image on a print medium. A storage device (e.g., storage medium 112) is to store a first halftoning screen and a second halftoning screen. The second halftoning screen has a spatial frequency that is substantially the same as the first halftoning screen while having a spatial signature different from the first halftoning screen. Control unit 125 is to control the image former (e.g., printing device 110) to form two different printed copies of an image using the first halftoning screen and the second halftoning screen.

Figure 2:
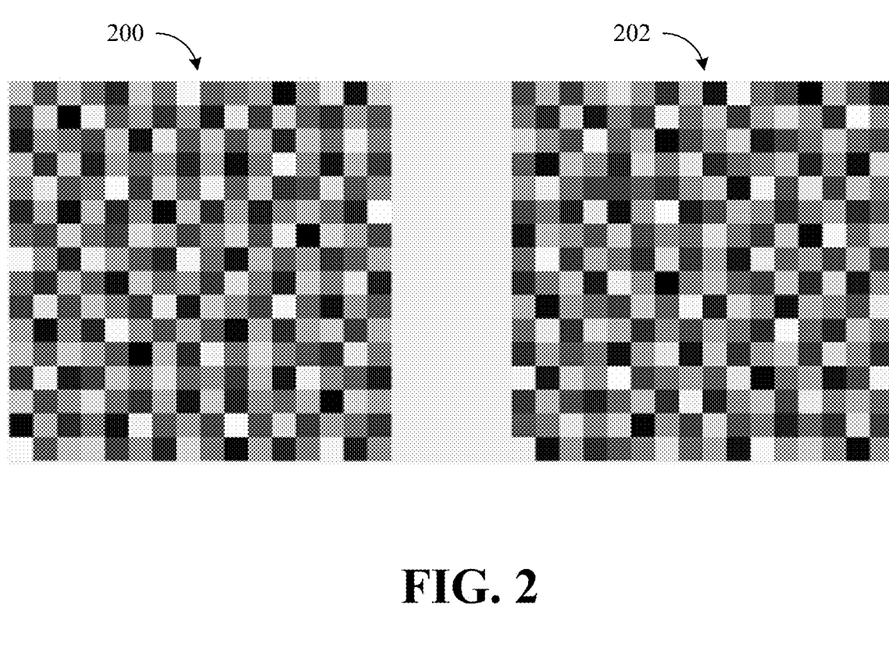
FIG. 2 is an illustration of two spectrally identical selector matrices according to an example.

FIG. 2 is an illustration of two spectrally identical selector matrices according to an example. As discussed above, a HANS (Halftone Area Neugebauer Separation) printing pipeline uses color resources (e.g., look-up tables (LUTs)) as well as halftoning resources (e.g., Parallel Random Weighted Area Coverage Selection (PARAWACS) halftone matrix). In the illustrated example, two selector matrices 200/202 are generated for a given product line. The first selector matrix 200 is a high quality PARAWACS matrix that is used for default prints. The second selector matrix 202 is another, high quality but different PARAWACS matrix that is used for limited edition prints only.

Both selector matrices 200/202 have substantially the same spatial-frequency-spectral properties (e.g., both are equally high quality blue noise patterns) but different spatial distributions-both due to the randomness of the blue-noise pattern generation process as well as (optionally) due to the introduction of on-purpose high-frequency elements that don't alter the perceptual quality of the pattern but introduce elements detectable by imaging systems.

As will be described in greater detail below, given a print-job, the workflow proceeds as follows, where the distinction between the two alternatives is made in a secured way (e.g., enabled by blockchain-controlled rights management): if the print-job is a common case where there is no need to ensure a limited edition print is being made, PARAWACS selector matrix 200 will be used. If the print-job is a limited edition print (e.g., a printing of more than two prints but having a specified limited number), then PARAWACS selector matrix 202 is being used. Additionally, or alternatively, if the print-job is a unique edition print (e.g., only a single print is intended to be made), then a corresponding unique PARAWACS selector matrix is generated.

PARAWACS selector matrices 200 and 202 are built such that they are both blue-noise, equally high quality, but that the detection mechanism (e.g., a mobile phone capture of the printed output) can clearly distinguish one from the other. Accordingly, PARAWACS selector matrices 200 and 202 are spectrally identical while having different spatial signatures.

Figure 3:
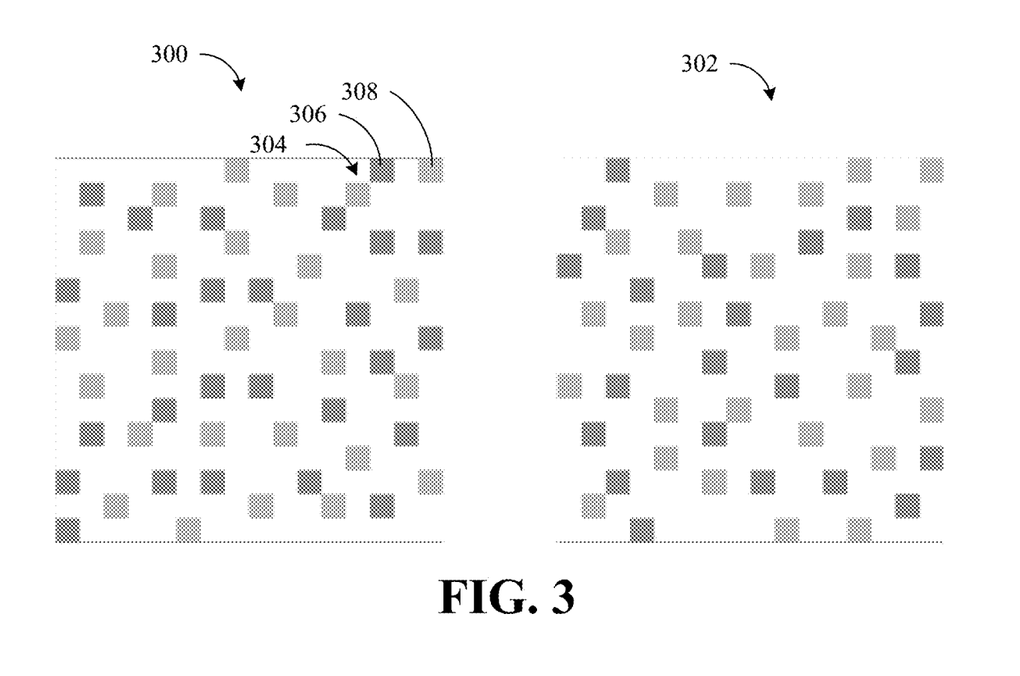
FIG. 3 is an illustration of two halftoning screens according to an example.

FIG. 3 is an illustration of two halftoning screens according to an example. In the illustrated example, the two PARAWACS selector matrices (e.g., PARAWACS selector matrix 200 and 202 of FIG. 2) correspond to two different halftoning screen patterns 300 and 302 (for the same Neugebauer Primary area coverage (NPac) color space).

As illustrated, each of the halftoning screen patterns 300 and 302 include a plurality of high frequency elements 304. These high frequency elements 302 are illustrated here as a distribution of cyan dots 306 and magenta dots 308 in the halftone pattern.

As discussed above, some implementations described herein utilize HANS/PARAWACS (Halftone Area Neugebauer Separation/Parallel Random Weighted Area Coverage Selection) halftoning and masking, which is based on a single pattern-generating matrix. This single pattern-generating matrix is built such that it satisfies perceptual pleasantness; however, this single pattern-generating matrix also involves randomness (e.g., therefore no two matrices built using the same parameters are the same) and allows for fine-grained control of all frequencies.

Advantageously, these two elements allow matrices to be built that to the observer will result in practically identical high image quality between two different prints, but at closer inspection can be identified as being different patterns and hence allow for authentication. Accordingly, some implementations described herein therefore are particularly useful in authentication workflows.

Advantageously, the techniques described herein enable a controlled variation in print that does not affect image quality, enable differentiation of types of print (e.g., common editions or limited editions), and/or enable specific copy identification (e.g., a specific copy number of a limited edition run).

Alternative ink channel-based solutions like matrix halftoning and error diffusion might be utilized instead of the techniques described herein. However, such matrix halftoning and error diffusion will typically look inferior to the techniques described herein as such matrix halftoning and error diffusion tend to create artifacts like moire.

Figure 4:
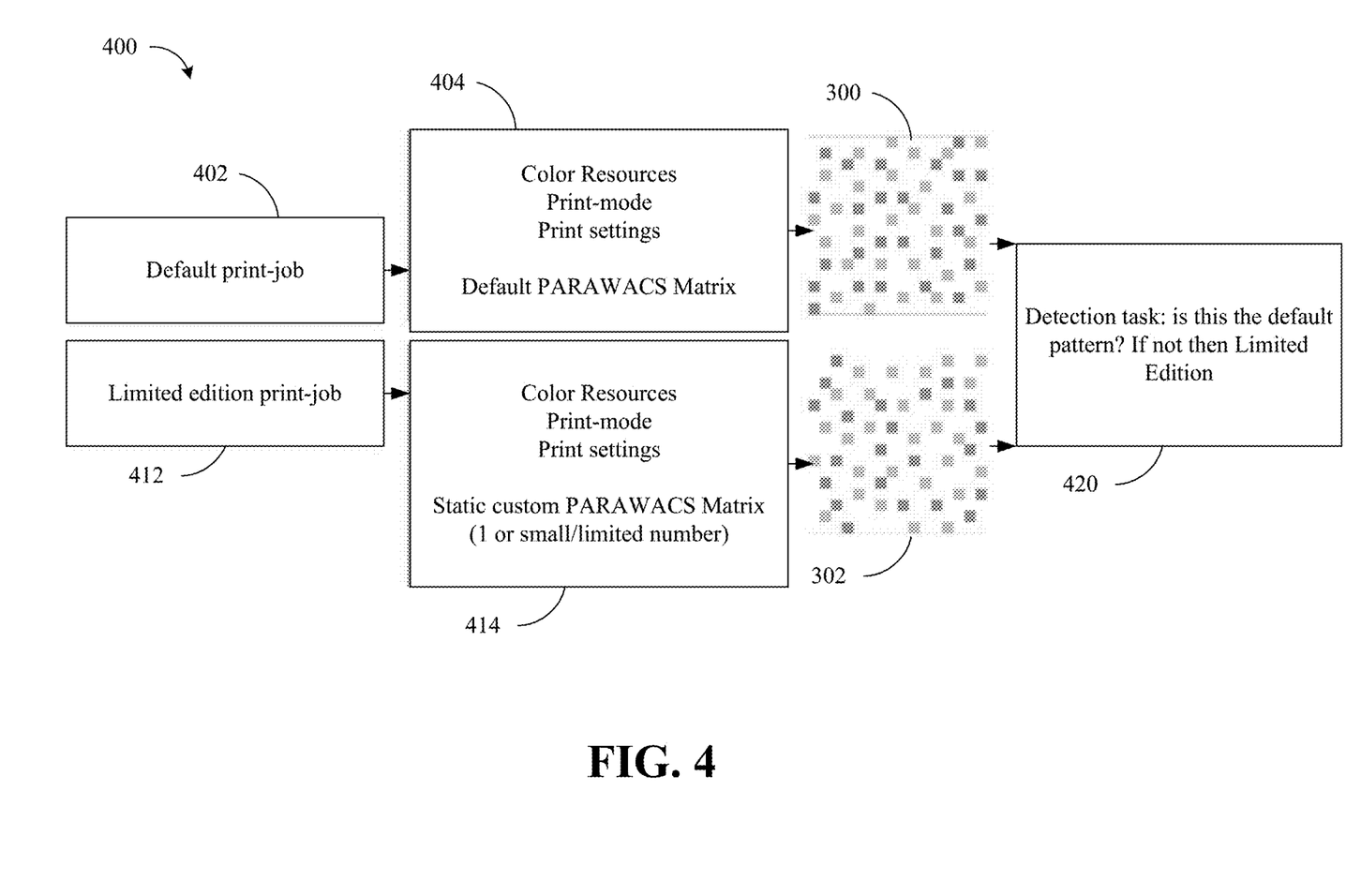
FIG. 4 is an illustration of an example method for custom halftone usage in limited edition prints according to an example.

FIG. 4 is an illustration of an example method 400 for custom halftone usage in limited edition prints according to an example. In the illustrated example, an example workflow for case 1 (e.g., distinguish a limited edition print from a regular print) is shown.

Method 400 focuses on identifying limited edition prints and distinguishing them from regular prints. The idea can be applied in differentiating or authenticating a printed copy from another based on the halftoning pattern formed on the printed copy. A printed pattern made by PARAWACS/HANS can be differentiated from others (e.g., made by the alternative solutions) by printing and looking at large and tiled area fills.

Illustrated processing block 402 provides for receiving a request for a regular edition print.

Illustrated processing block 404 provides for utilizing a default PARAWACS selection matrix to generate a first halftoning screen 300.

Illustrated processing block 412 provides for receiving a request for a limited edition print.

Illustrated processing block 414 provides for utilizing a static custom PARAWACS selection matrix to generate a second halftoning screen 302.

Illustrated processing block 420 provides for determining the print status. For example, captured picture data may be utilized to search for the first halftoning screen 300 or second halftoning screen 302. In this way, first halftoning screen 300 or second halftoning screen 302 are utilized to distinguish limited edition prints from regular edition prints, without compromising the visual accuracy of the prints.

In operation, the determination of print status occurs without reference to a central database in some examples. For example, the regular edition print with a static halftone screen resource that exists already at a printer (e.g., in a storage device of a printer). This means that this static halftone screen resource would be stored in the printer and could also be stored in whatever the identification system (e.g., a mobile phone application, a dedicated inspection device, or the like). In the simpler case of determining only if a print is a regular one or a limited edition one, the device might only need to know the regular edition halftone screen and the corresponding spectral properties and spatial frequency. So long as the detection determines that the print has not been processed with the regular edition halftone screen but has the same spectral properties and spatial frequency characteristics of the known regular edition halftone screen then a determination is made that it is a limited edition print.

For example, this could be done by an identification system (e.g., a mobile phone application, a dedicated inspection device, or the like) that would capture some part of the print (e.g., an arbitrary part) and perform image processing analysis on the captured image in order to determine a correlation to the regular halftone screen. In such an example, some form of knowledge about possible patterns is needed for this identification step, but it does not necessarily need to be a real-time/on-line reference to a central database (e.g., a print service provider server). For example, if a limited number of preset halftoning screen patterns are used by a plurality of printers, then the identification system (e.g., a mobile phone application, a dedicated inspection device, or the like) may also be supplied with knowledge which patterns to look for (e.g., the preset halftoning screen patterns).

In the simplest case, the identification system (e.g., a mobile phone application, a dedicated inspection device, or the like) may only know which preset halftoning screen pattern characteristics are used for regular prints. Then, so long as the sample examined is different from the known regular edition halftone screen but also has the same spectral properties and spatial frequency characteristics of the known regular edition halftone screen, the identification system would know that an unknown preset halftoning screen pattern indicates a limited edition print.

In some implementations, the pipeline has a static halftoning screen that is used for a given setup (e.g., print-mode, density, substrate, etc.). In some examples, the static halftoning screen can even be the same single halftoning screen used for all setups (e.g., independent of print-mode, density, substrate, etc.). This could also be the case even in the context of a limited edition printing functionality where for a regular print there is no special process and the static halftone screen is utilized for the regular print.

In some examples, the printer is equipped with multiple static screens (e.g., at least two: a regular edition screen and a limited edition screen) available. For example, depending on the type of print (regular or limited edition) the appropriate screen is used. If this multiple static screens example was the case and if these resources are built in the factory, then there need not be an exchange of data between the printer and centralized system (e.g., a print service provider server) at print time.

Figure 5:
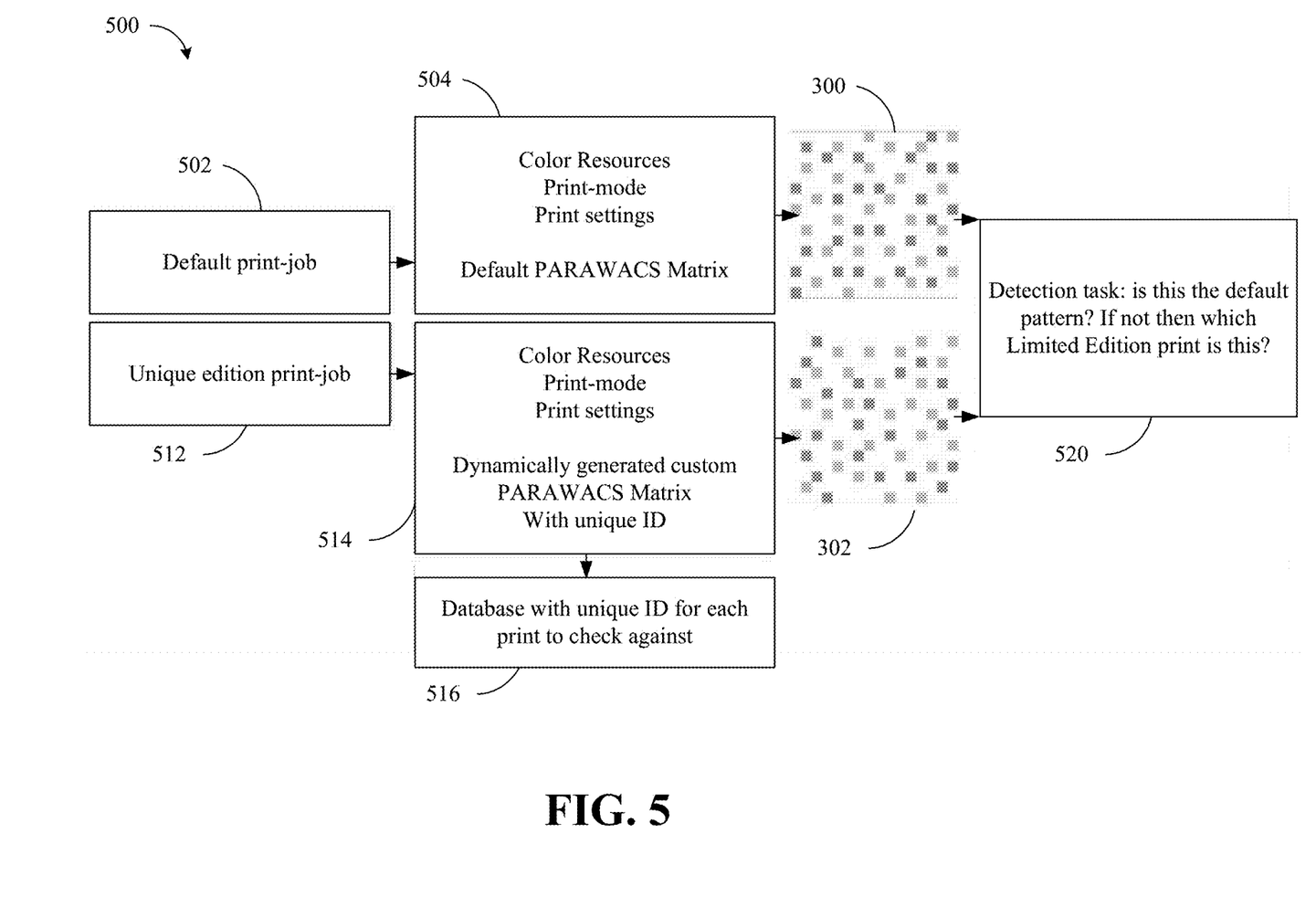
FIG. 5 is an illustration of an example method for custom halftone usage in limited edition prints according to an example.

FIG. 5 is an illustration of an example method 500 for custom halftone usage in limited edition prints according to an example. In the illustrated example, method 500 is an example of case 2 that focuses on identifying a unique edition print in question (e.g., identify a single specific print).

Method 500 focuses on providing more granularity but relies on specific detection techniques and detection precision. A key difference between method 500 as compared to method 400 is that in method 400 only 2 pre-generated patterns are required, while in method 500 the limited edition print patterns are dynamically generated for each limited edition print. In both cases an identifier can be stored in a central database against which detection can be checked to validate the authenticity of a given print.

Illustrated processing block 502 provides for receiving a request for a regular edition print.

Illustrated processing block 504 provides for utilizing a default PARAWACS selection matrix to generate a first halftoning screen 300.

Illustrated processing block 512 provides for receiving a request for a unique edition print.

Illustrated processing block 514 provides for utilizing a dynamically generated PARAWACS selection matrix to generate a second halftoning screen 302.

Illustrated processing block 516 provides for storing the unique dynamically generated second halftoning screens 302 in a database for later verification.

Illustrated processing block 520 provides for determining the print status. For example, captured picture data may be utilized to search for the second halftoning screen 302 in the database for verification. In this way, first halftoning screen 300 or second halftoning screen 302 are utilized to distinguish unique edition prints from regular edition prints, without compromising the visual accuracy of the prints.

In operation, the difference of this authentication/validation to that of processing block 420 (FIG. 4) is that processing block 520 determines not only whether a print is a regular or limited edition one, but also which limited edition one it is (e.g., which unique edition print it is), for example. This means a higher degree of analysis and also a more direct detection and correlation to each of the possible halftone screens which requires for any such system to have knowledge of each of the possible halftone screens. Such knowledge may be stored for retrieval from a central database (e.g., a print service provider server).

Alternatively, or additionally, the halftoning screen may be preset static halftoning screens stored in the printer and therefore provided in advance to any identification system (e.g., a mobile phone application, a dedicated inspection device, or the like) as well.

Alternatively, or additionally, the halftoning screen may be dynamically and uniquely determined by some set of parameters at the printer and that allow the identification system (e.g., a mobile phone application, a dedicated inspection device, or the like) to re-generate the pattern characteristics.

In some implementations, only when limited edition prints are to be printed is there an exchange of approvals (and data) with a centralized system (e.g., a print service provider server). For example, for the case of a limited edition print approval is sought with a centralized system (e.g., a print service provider server) and an actual resource in the form of a halftone screen is obtained in order to use in the pipeline to print with.

Figure 6:
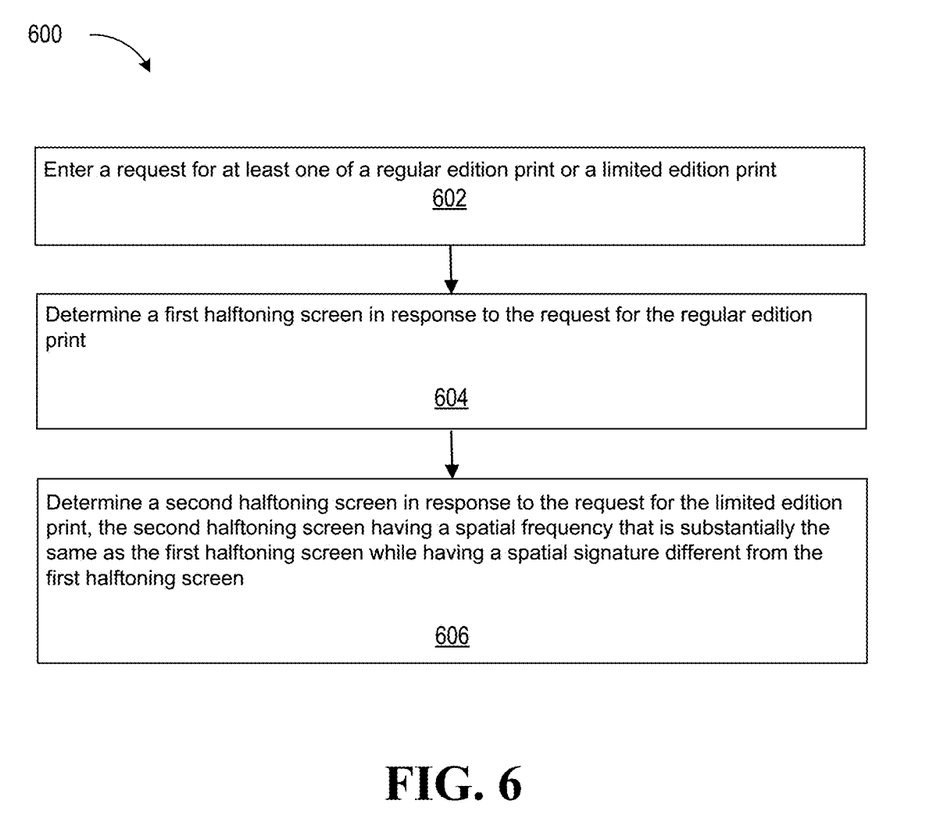
FIG. 6 is an illustration of a flowchart of an example method for custom halftone usage in limited edition prints according to an example.

FIG. 6 is an illustration of a flowchart of an example method 600 for custom halftone usage in limited edition prints according to an example. As illustrated, the method 600 may generally be implemented in a printing system, such as, for example, the printer system 100 (FIG. 1), already discussed.

In an example, the method 600 may be implemented in computer readable instructions (e.g., software), configurable computer readable instructions (e.g., firmware), fixed-functionality computer readable instructions (e.g., hardware), etc., or any combination thereof.

Illustrated processing block 602 provides for entering a request for prints. For example, a request is entered for at least one of a regular edition print or a limited edition print.

Illustrated processing block 604 provides for determining a first halftoning screen. For example, a first halftoning screen may be determined in response to the request for the regular edition print.

Illustrated processing block 606 provides for determining a second halftoning screen. For example, a second halftoning screen is determined in response to the request for the limited edition print. In some examples, the second halftoning screen has a spatial frequency that is substantially the same as the first halftoning screen while having a spatial signature different from the first halftoning screen.

In operation method 600 includes forming two different printed copies of an image using the first halftoning screen and the second halftoning screen.

In some implementations, the second halftoning screen further has spectral properties that are substantially the same as the first halftoning screen. For example, the second halftoning screen having the spectral properties and the spatial frequency that are substantially the same as the first halftoning screen means that the spectral properties and the spatial frequency are similar to the point that the two different printed copies of the image using the first halftoning screen and the second halftoning screen are of identical image quality to a human observer.

In some examples, the second halftoning screen identifies a limited number of one or more prints in response to the request for the one or more limited edition prints, while the second halftoning screen uniquely identifies only a single print in response to the request for the one or more unique edition prints.

In some implementations, the spatial frequency of the first halftoning screen comprises a first blue noise pattern with a first spatial distribution, while the spatial frequency of the second halftoning screen comprises a second blue noise pattern with a second spatial distribution. In such an example, the second blue noise pattern with the second spatial distribution is different from the first blue noise pattern with the first spatial distribution. Further, the spatially different signatures are a pattern detectable by an imaging system. As used herein the term "blue noise" refers to providing per-pixel random values to make noise patterns in rendering with randomly placed points (e.g., like white noise) but the randomly placed points are approximately evenly spaced.

As will be described in greater detail below, in operation, method 600 further includes sending, to a print service provider, a request to print the one or more regular edition prints, the one or more limited edition prints, or the one or more unique edition prints. Permission may be received, from the print service provider, to print the one or more regular edition prints, the one or more limited edition prints, or the one or more unique edition prints.

It will be appreciated that some or all of the operations in method 600 are described using a "pull" architecture (e.g., polling for new information followed by a corresponding response) may instead be implemented using a "push" architecture (e.g., sending such information when there is new information to report), and vice versa.

Additional and/or alternative operations for method 600 are described in greater detail below in the description of FIG. 7.

Figure 7:
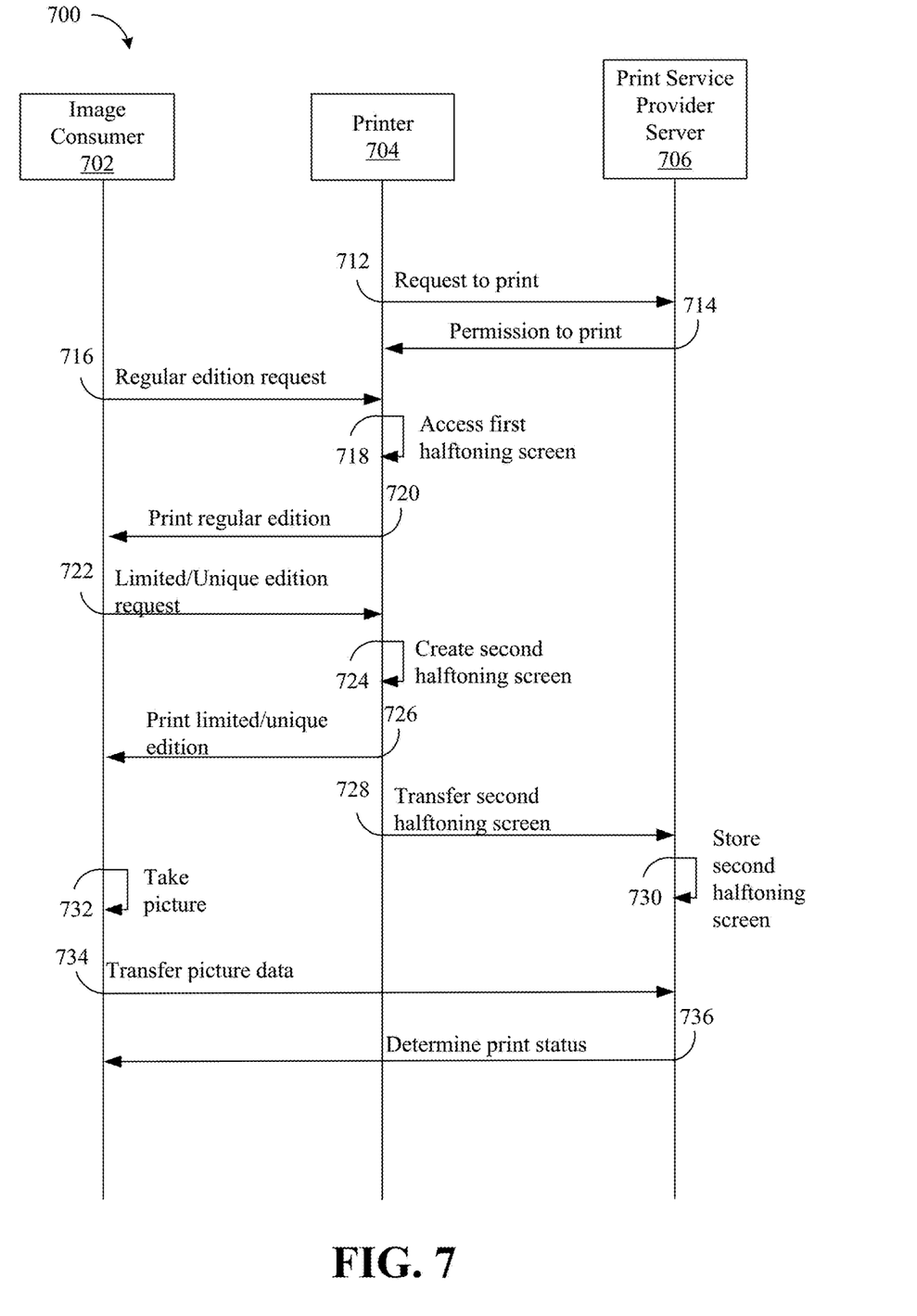
FIG. 7 is an illustration of a flowchart of a further example method for custom halftone usage in limited edition prints according to an example.

FIG. 7 is an illustration of a flowchart of another example method 700 for custom halftone usage in limited edition prints according to an example. As illustrated, the method 700 may generally be implemented in a printing system, such as, for example, server 706.

In the illustrated example, server 706 may represent a server of a print service provider in communication with a printer 704 and/or an image consumer 702.

In an example, the method 700 may be implemented in computer readable instructions (e.g., software), configurable computer readable instructions (e.g., firmware), fixed-functionality computer readable instructions (e.g., hardware), etc., or any combination thereof.

Illustrated processing block 712 provides for receiving a request to print. For example, a print service provider receives a request to print a limited edition print.

Illustrated processing block 714 provides for sending a permission to print. For example, the print service provider sends a permission to print the regular edition prints, the limited edition print, or the unique edition print in response to the request.

For example, the print service provider will either confirm the requestor already has permission to perform these actions or will register the requestor for such permission.

Illustrated processing block 716 provides for receiving a request for a regular edition print. For example, a printer may receive such a request from an image consumer.

Illustrated processing block 718 provides for accessing a first halftoning screen. For example, a first halftoning screen is associated with the regular edition print.

In some examples, the second halftoning screen may be previously created by another party and stored for use by the printer. In other examples, the second halftoning screen may be determined by the printer in response to a print request.

Illustrated processing block 720 provides for printing a regular edition print. For example, a printer may print the regular edition print utilizing the first halftoning screen.

Illustrated processing block 722 provides for receiving a request for a limited or unique edition print. For example, a printer may receive such a request from an image consumer.

Illustrated processing block 724 provides for creating a second halftoning screen. For example, illustrated processing block 724 provides for utilizing a dynamically generated PARAWACS selection matrix to generate a second halftoning screen at the printer. For example, a second halftoning screen is associated with the limited edition print or the unique edition print. In such an example, the second halftoning screen has a spatial frequency that is substantially the same as the first halftoning screen while having a spatial signature different from the first halftoning screen.

In some examples, the second halftoning screen may be previously created by another party and stored as a preset halftoning screen for use by the printer.

In some implementations, the second halftoning screen may be created by the print service provider and transferred to the printer. For example, the second halftoning screen may be created by the print service provider and transferred to the printer in response to the request at processing block 712.

Illustrated processing block 726 provides for printing a limited/unique edition print. For example, a printer may print the limited/unique edition print utilizing the second halftoning screen.

Illustrated processing block 728 provides for transfer of the second halftoning screen. For example, the print service provider may receive the second halftoning screen for retention by the print service provider.

Illustrated processing block 730 provides for storing the second halftoning screen. For example, the print service provider may store the second halftoning screen for future verification.

Illustrated processing block 732 provides for taking a picture of a print. For example, the image consumer may take a picture of a print.

Illustrated processing block 734 provides for transferring picture data. For example, the print service provider may receive picture data taken from an image capturing device.

Illustrated processing block 736 provides for determining a print status. For example, the print service provider will determine whether the picture data is from the regular edition print, the limited edition print, or the unique edition print (e.g., where the unique edition print identifies each individual copy of the limited edition prints) based on the second halftoning screen.

It will be appreciated that some or all of the operations in method 700 are described using a "pull" architecture (e.g., polling for new information followed by a corresponding response) may instead be implemented using a "push" architecture (e.g., sending such information when there is new information to report), and vice versa.

Figure 8:
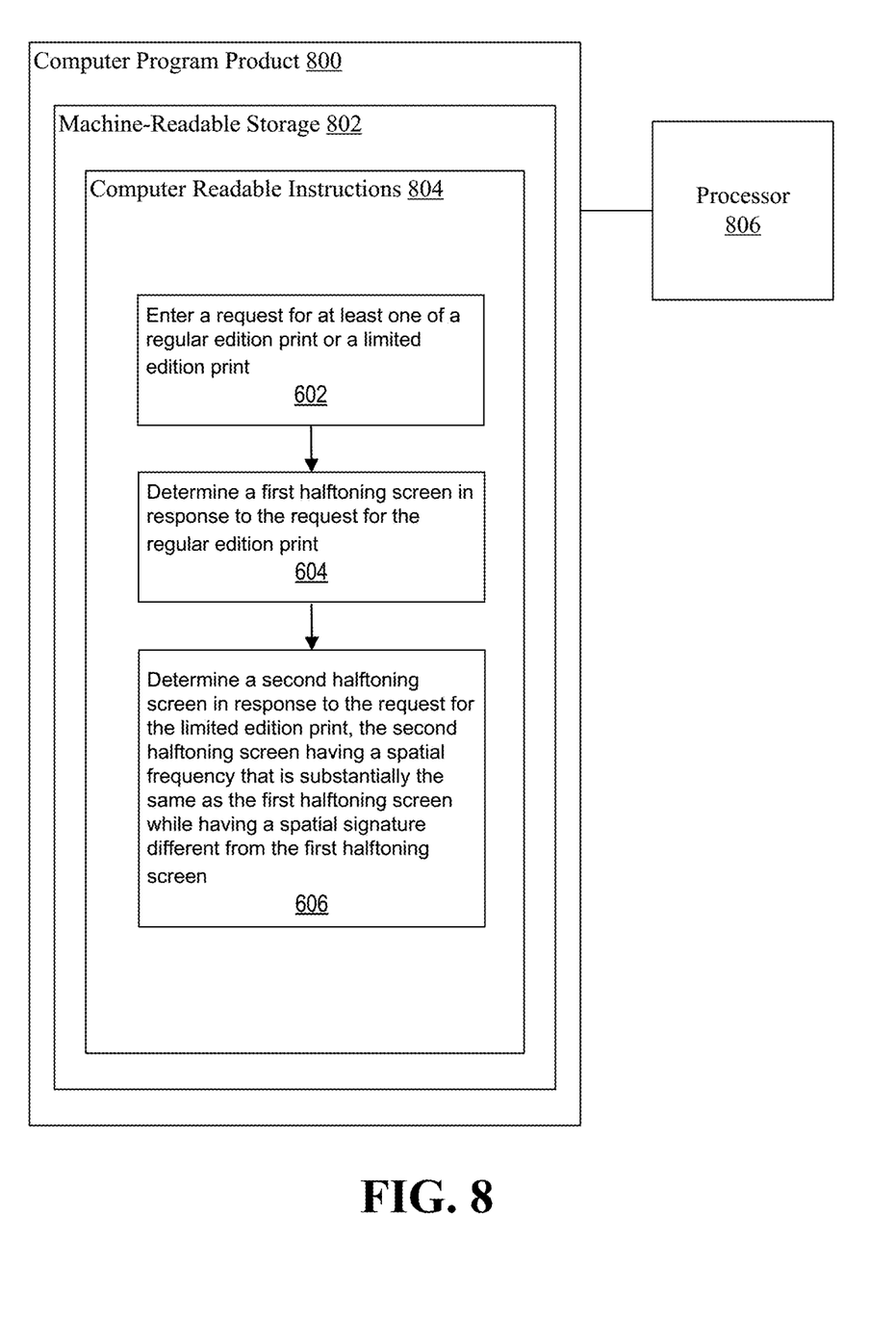
FIG. 8 is a block diagram illustrating a computer program product according to an example.

FIG. 8 illustrates a block diagram of an example computer program product 800. In some examples, as shown in FIG. 8, computer program product 800 includes a machine-readable storage 802 that may also include computer readable instructions 804. In some implementations, the machine-readable storage 802 may be implemented as a non-transitory machine-readable storage. In some implementations the computer readable instructions 804, which may be implemented as software, for example. In an example, the computer readable instructions 804, when executed by a processor 806, implement one or more aspects of the method 600 (FIG. 6), the method 700 (FIG. 7), and/or the printer system 100 (FIG. 1), already discussed.

Figure 9:
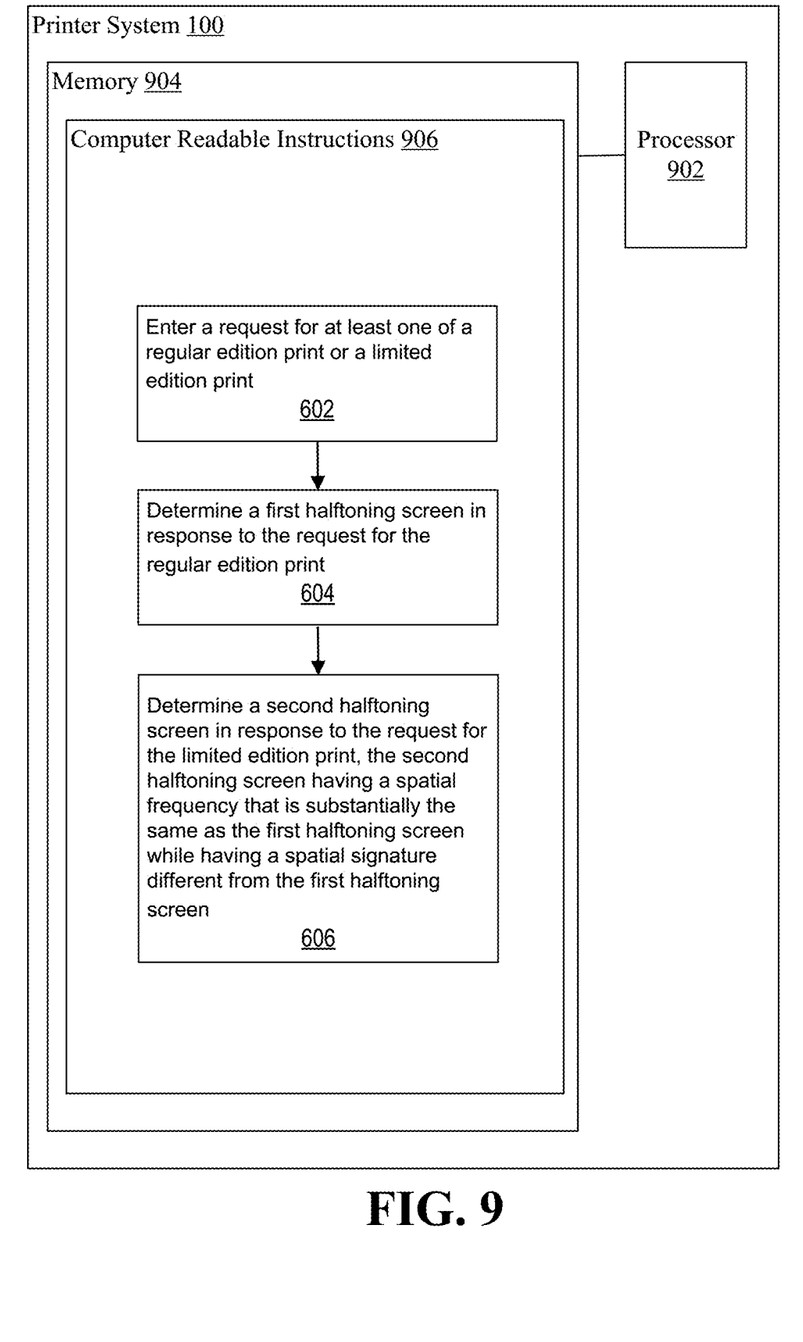
FIG. 9 is a block diagram illustrating an example printer according to an example.

FIG. 9 shows an illustrative example of the printer system 100. In the illustrated example, the printer system 100 may include a processor 902 and a memory 904 communicatively coupled to the processor 902. The memory 904 may include computer readable instructions 906, which may be implemented as software, for example. In an example, the computer readable instructions 906, when executed by the processor 902, implement one or more aspects of the method 600 (FIG. 6), the method 700 (FIG. 7), and/or the printer system 100 (FIG. 1), already discussed.

In some implementations, the processor 902 may include a general purpose controller, a special purpose controller, a storage controller, a storage manager, a memory controller, a micro-controller, a general purpose processor, a special purpose processor, a central processor unit (CPU), the like, and/or combinations thereof.

Further, implementations may include distributed processing, component/object distributed processing, parallel processing, the like, and/or combinations thereof. For example, virtual computer system processing may implement one or more of the methods or functionalities as described herein, and the processor 902 described herein may be used to support such virtual processing.

In some examples, the memory 904 is an example of a computer-readable storage medium. For example, memory 904 may be any memory which is accessible to the processor 902, including, but not limited to RAM memory, registers, and register files, the like, and/or combinations thereof. References to "computer memory" or "memory" should be interpreted as possibly being multiple memories. The memory may for instance be multiple memories within the same computer system. The memory may also be multiple memories distributed amongst multiple computer systems or computing devices.

Figure 10:
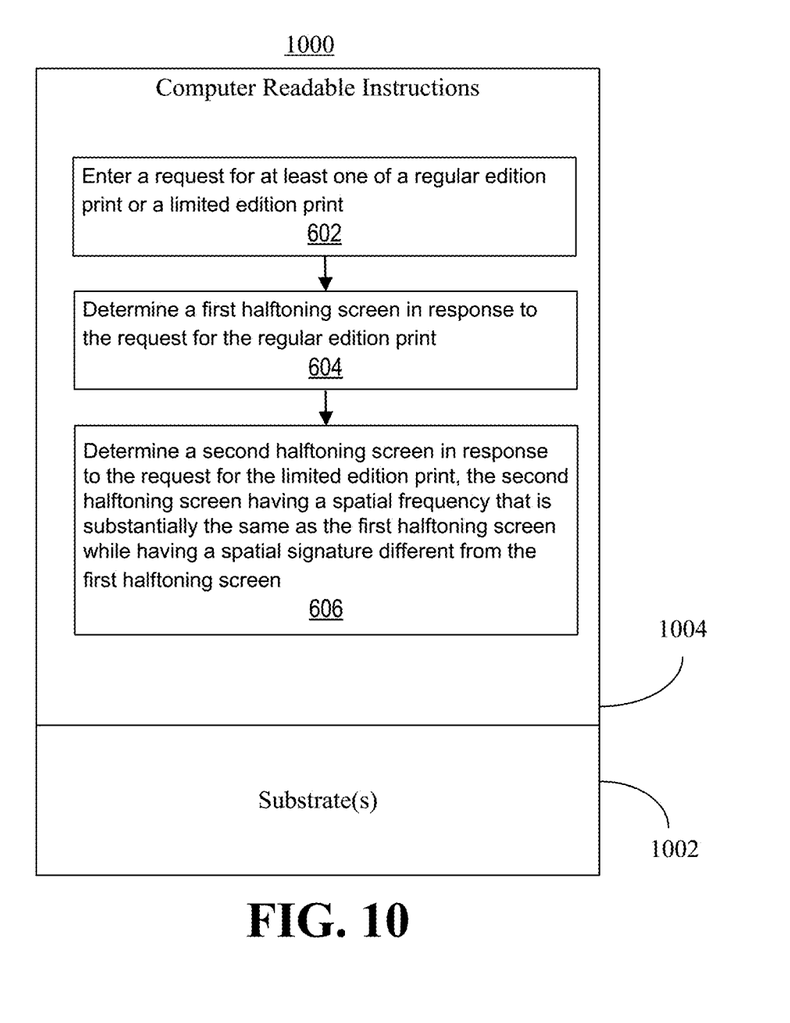
FIG. 10 is a block diagram illustrating a hardware apparatus including a semiconductor package according to an example.

FIG. 10 shows an illustrative semiconductor apparatus 1000 (e.g., chip and/or package). The illustrated apparatus 1000 includes one or more substrates 1002 (e.g., silicon, sapphire, or gallium arsenide) and computer readable instructions 1004 (such as, configurable computer readable instructions (e.g., firmware) and/or fixed-functionality computer readable instructions (e.g., hardware)) coupled to the substrate(s) 1002. In an example, the computer readable instructions 1004 implement one or more aspects of the method 600 (FIG. 6), the method 700 (FIG. 7), and/or the printer system 100 (FIG. 1), already discussed.

In some implementations, computer readable instructions 1004 may include transistor array and/or other integrated circuit/IC components. For example, configurable firmware logic and/or fixed-functionality hardware logic implementations of the computer readable instructions 1004 may include configurable computer readable instructions such as, for example, programmable logic arrays (PLAs), field programmable gate arrays (FPGAs), complex programmable logic devices (CPLDs), or fixed-functionality computer readable instructions (e.g., hardware) using circuit technology such as, for example, application specific integrated circuit (ASIC), complementary metal oxide semiconductor (CMOS) or transistor-transistor logic (TTL) technology, the like, and/or combinations thereof.

All definitions, as defined and used herein, should be understood to control over dictionary definitions, definitions in documents incorporated by reference, and/or ordinary meanings of the defined terms.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although a number of illustrative examples are described herein, it should be understood that numerous other modifications and examples can be devised by those skilled in the art that will fall within the spirit and scope of the principles of the foregoing disclosure. More particularly, reasonable variations and modifications are possible in the component parts and/or arrangements of the subject combination arrangement within the scope of the foregoing disclosure, the drawings and the appended claims without departing from the spirit of the foregoing disclosure. In addition to variations and modifications in the component parts and/or arrangements, alternative uses will also be apparent to those skilled in the art. The examples may be combined to form additional examples.

We claim:

1. A method comprising:
   entering a request for at least one of a regular edition print or a limited edition print;
   determining a first halftoning screen in response to the request for the regular edition print;
   determining a second halftoning screen in response to the request for the limited edition print, the second halftoning screen having a spatial frequency that is substantially the same as the first halftoning screen while having a spatial signature different from the first halftoning screen; and
   printing two different printed copies of an image using the first halftoning screen and the second halftoning screen.

2. The method of claim 1, further comprising:
   sending, to a print service provider, a request to print the limited edition print; and
   receiving, from the print service provider, permission to print the regular edition print or the limited edition print.

3. The method of claim 1, further comprising:
   sending, to a print service provider, the second halftoning screen for retention by the print service provider.

4. The method of claim 1, further comprising:
   creating the second halftoning screen at a printer.

5. The method of claim 1, wherein the second halftoning screen further has spectral properties that are substantially the same as the first halftoning screen.

6. The method of claim 5, wherein the second halftoning screen having the spectral properties and the spatial frequency that are substantially the same as the first halftoning screen comprises the spectral properties and the spatial frequency producing practically identical image quality to a human observer in the two different printed copies of the image using the first halftoning screen and the second halftoning screen.

7. The method of claim 1, wherein the second halftoning screen identifies a limited number of prints in response to the request for the limited edition prints.

8. The method of claim 1, wherein the spatial frequency of the first halftoning screen comprises a first blue noise pattern with a first spatial distribution, and wherein the spatial frequency of the second halftoning screen comprises a second blue noise pattern with a second spatial distribution, and wherein the second blue noise pattern with the second spatial distribution is different from the first blue noise pattern with the first spatial distribution.

9. A method comprising:
   receiving, at a print service provider, a request to print a regular edition print or a limited edition print;
   sending, from the print service provider, permission to print the regular edition print or the limited edition print, wherein a first halftoning screen is associated with the regular edition print, wherein a second halftoning screen is associated with the limited edition print, the second halftoning screen having a spatial frequency that is substantially the same as the first halftoning screen while having a spatial signature different from the first halftoning screen; and
   printing two different printed copies of an image using the first halftoning screen and the second halftoning screen.

10. The method of claim 9, further comprising:
    receiving, at the print service provider, the second halftoning screen for retention by the print service provider.

11. The method of claim 10, further comprising:
    receiving, at the print service provider, picture data taken from an image capturing device; and
    determining, at the print service provider, whether the picture data is from the regular edition print or the limited edition print.

12. At least one non-transitory computer readable storage medium comprising a set of executable program instructions, which when executed by a computing system, cause the computing system to:
    enter a request for at least one of a regular edition print or a limited edition print;
    determine a first halftoning screen in response to the request for the regular edition print;
    determine a second halftoning screen in response to the request for the limited edition print, the second halftoning screen having a spatial frequency that is substantially the same as the first halftoning screen while having a spatial signature different from the first halftoning screen; and
    print two different printed copies of an image using the first halftoning screen and the second halftoning screen.

13. The at least one non-transitory computer readable storage medium of claim 12, wherein the instructions, when executed, further cause the computing system to:
    send, to a print service provider, a request to print the limited edition print; and
    receive, from the print service provider, permission to print the regular edition print or the limited edition print.

14. The at least one non-transitory computer readable storage medium of claim 12, wherein the instructions, when executed, further cause the computing system to:
    send, to a print service provider, the second halftoning screen for retention by the print service provider.

15. The at least one non-transitory computer readable storage medium of claim 12, wherein the instructions, when executed, further cause the computing system to:
    create the second halftoning screen at a printer.

* * * * *